Figure 1:
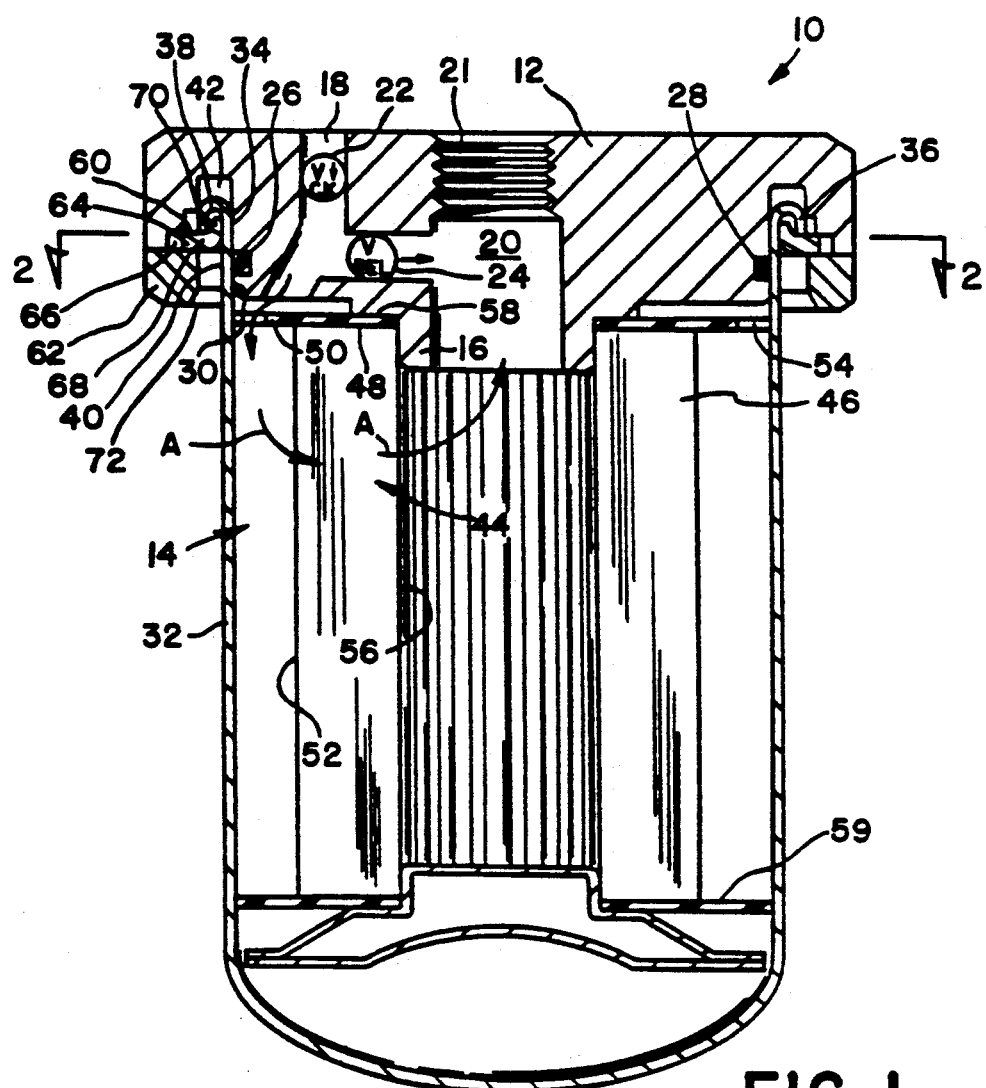

United States Patent [19]
Conti

[11] Patent Number: 5,084,162
[45] Date of Patent: Jan. 28, 1992

[54] PUSH-ON AUTOMOTIVE FILTER

[75] Inventor: Kenneth A. Conti, Barrington, R.I.

[73] Assignee: Allied-Signal Inc., Morristown, N.J.

[21] Appl. No.: 592,153

[22] Filed: Oct. 3, 1990

[51] Int. Cl.$^5$ ............................................. B01D 27/08
[52] U.S. Cl. ..................................... 210/232; 210/444
[58] Field of Search ............... 210/232, 238, 440, 443, 210/444, 454

[56] References Cited

U.S. PATENT DOCUMENTS

| | | | |
|---|---|---|---|
| 3,490,594 | 1/1970 | Hutchins, Jr. | 210/444 |
| 3,513,979 | 5/1970 | Miller et al. | 210/232 |
| 3,950,251 | 4/1976 | Hiller | 210/232 |
| 4,028,248 | 6/1977 | Murauskas et al. | 210/232 |
| 4,048,071 | 9/1977 | Yamada et al. | 210/90 |
| 4,052,307 | 10/1977 | Humbert, Jr. | 210/130 |
| 4,133,763 | 1/1979 | Cooper | 210/232 |
| 4,371,439 | 2/1983 | Thornton | 210/232 |
| 4,382,808 | 5/1983 | Van Wormer, Jr. et al. | 210/440 |
| 4,548,714 | 10/1985 | Kirwan, Jr. et al. | 210/232 |
| 4,588,503 | 5/1986 | Sugiura | 210/232 |
| 4,732,678 | 3/1988 | Humbert, Jr. | 210/440 |
| 4,764,275 | 8/1988 | Robichaud | 210/232 |
| 4,767,530 | 8/1988 | Gilliam et al. | 210/232 |

FOREIGN PATENT DOCUMENTS 1339895 12/1973 United Kingdom ................. 210/444

Primary Examiner—W. Gary Jones
Assistant Examiner—Matthew O. Savage
Attorney, Agent, or Firm—Ken C. Decker; William N. Antonis

[57] ABSTRACT

A filter assembly includes a base and a filter cartridge installed on the base. The filter cartridge is retained on the base by a radially expandable, resilient, circumferentially extending snap ring which is expanded by rotation of a camming member located between contiguous ends of the snap ring. The snap ring includes a lip which engages a groove on the filter cartridge to hold the filter cartridge on the base.

5 Claims, 1 Drawing Sheet

PUSH-ON AUTOMOTIVE FILTER

This invention relates to a liquid filter.

Existing liquid filters used for filtering, for example, the lubricating oil of an automotive vehicle, are usually the so-called "spin-on" filter in which the filter housing is provided with a threaded outlet opening which is engaged with a mounting stud extending from a mounting surface on the vehicle engine. The filter also carries a gasket which circumscribes the threaded opening and which is tightened against the mounting surface on the engine to provide a seal which prevents leakage of the lubricating oil. Since the so-called spin-on filters depend upon the sealing engagement of the gasket with the mounting surface in order to prevent leakage, there is a tendency when installing such filters to overtighten the filter to insure a fluid-tight seal. Accordingly, such gaskets have a tendency to stick to the mounting surface, making subsequent removal difficult. Because the filter must be properly tightened against the mounting surface, removal and installation of the filter takes more time than is necessary. Also, the throwaway portion of the filter includes anti-drainback and relief valves which are thrown away each time the filter is changed. Still further, the threaded mounted opening must be made from a relatively thick tapping plate which must be secured to the rest of the filter housing, thereby increasing manufacturing cost.

The present invention provides a throwaway filter which is installed on a fixed mounting base. The filter has an open end without a tapping plate, and is clamped radially against the mounting base. A radial seal engages the housing, so that a fluid-tight seal is automatically assured without the difficulty of tightening a gasket against the mounting base.

A similar filter is disclosed in prior art U.S. Pat. No. 3,490,594. However, this design depends upon a relatively complicated, segmented ring in order to hold the filter in place, and requires a tool which circumscribes the filter and which forces the jaws of the segmented ring away from the filter when the filter is changed. The present invention employs a simple, continuous, resilient snap-ring which holds the filter in place on the base. The snap ring is expanded by rotating an eccentric between the continuous ends of the snap-ring to spread the snap-ring to allow the filter to be removed. Accordingly, removal and installation of the filter according to the invention is easier as compared to existing spin-on designs, and the cost inherent in the relatively complicated prior art designs is substantially reduced.

Figures 2, 3:
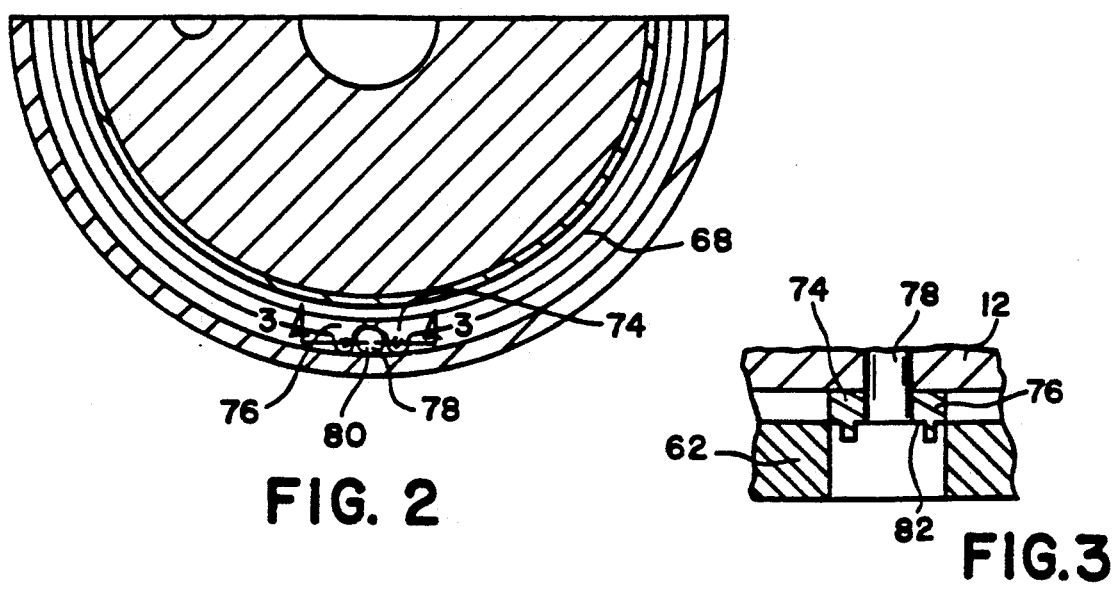

These and other advantages of the present invention will become apparent from the following description, with reference to the accompanying drawing, in which FIG. 1 is a cross-sectional view taken through a filter cartridge and filter base made pursuant to the teachings of the present invention;

FIG. 2 is a cross-sectional view taken substantially along lines 2—2 of FIG. 1; and FIG. 3 is a view taken substantially along lines 3—3 of FIG. 2.

Referring now to the drawings, a filter assembly generally indicated by the numeral 10 includes a base 12 and a replaceable filter cartridge assembly 14. The base 12 includes a projecting portion 16 through which an outlet passage 20 extends. An inlet passage 18 also extends through base 12. Although the base 12 may be manufactured as a part of the vehicle engine, the base 12 may also be provided as a retrofit unit for installation on existing mounting studs provided on vehicle engine to accommodate the prior art spin-on oil filters. In this case, the outlet opening 20 would be provided with threads 21 for engagement with corresponding threads on the mounting stud (not shown) provided on conventional engines, and the base would also be provided with a circumferentially extending gasket (not shown) for sealing engagement with the aforementioned mounting surface of the engine. The gasket would circumscribe both inlet opening 18 and the outlet opening 20. Since the base 12 is designed for permanent installation on the engine, the gasket could be compressed tightly against the mounting base to insure a fluid-tight seal. Sticking of the gasket to the mounting surface would not be a problem because the base 12 would not normally be removed from the vehicle once it is installed.

The inlet passage 18 is preferably equipped with an anti-drainback check valve 22. Anti-drainback check valve 22 permits flow of fluid through the inlet passage 18 into the replaceable filter cartridge assembly 14, but prevents flow of fluid in the reverse direction upon engine shutdown to prevent lubricating oil from draining out of the cartridge 14. Base 12 is also provided a bypass relief valve 24 which permits lubricating oil to pass directly from the inlet passage 18 to the outlet passage 20 bypassing the filter cartridge 14 when the Pressure differential between the inlet passage 18 and outlet passage 20 becomes sufficiently great, which is indicative of a clogged filter cartridge 14. Bypass of unfiltered lubricating oil is desirable under such circumstances to prevent the engine from being starved of lubricating oil. It should be noted that both the anti-drain back check valve and relief valve 24 are provided in the base 12, which is permanently installed on the engine. Accordingly, the cost of the filter cartridge 14 may be reduced, and the valves 22 and 24 may be economically manufactured from higher quality materials than is the existing practice. The base 12 and cartridge 14 are symmetrical with respect to the axis of the outlet passage 20.

The base 12 carries a circumferentially extending O-ring seal 26 which is carried in circumferentially extending groove 28. The seal 26 projects radially from the groove 28 an amount sufficient to sealingly engage the inner circumferential surface 30 of a cup-shaped housing 32 which defines an open end 34. The open end 34 is defined by a bent-over portion 36 of the housing 32 to define a circumferentially extending groove 38 between the bent-over portion 36 and the outer surface 40 of the housing 32. The end 34 of the housing 32 is received in a circumferentially extending groove 42 defined in the base 12. The depth of the groove 42 is sufficiently great to permit limited axial movement of the housing 32 with respect to the base 12, to thereby permit installation and removal of the filter cartridge 14 as will be hereinafter described.

Contained within the housing 32 is a filter element generally indicated by the numeral 44. Filter element 44 consists of conventional pleated filter paper, consisting of a conventional circumferentially extending array of radially tapering pleats generally indicated by the numeral 46. The upper edges of the pleats 46 are sealed by a conventional upper end cap 48, which projects radially as at portion 50 beyond the outer circumferential edges 52 of the pleats 46 into engagement with the inner circumferential surface 30 of the cup-shaped housing 32, to thereby locate the element 44 radially within the housing 32. Apertures 54 are provided in the portion 50 to permit the liquid being filtered to flow as indicated by the arrows A from the inlet Passage 18, through the element 40 in the direction from the outer edges 52 of the pleats comprising the element 40 to the inner edges 56 thereof, and then through the outlet passage 20. The end cap 48 seals against sealing surface 58 provided on projecting portion 16. Sealing surface 58 circumscribes the outlet passage 20. The lower edges (viewing FIG. 1) of the pleats are sealed by lower end cap 59.

The base 12 includes a relieved portion 60 which cooperates with a retaining ring 62 which is secured to extended portion 64 of the base 12 to define a radially projecting, circumferentially extending groove 66 which slidably receives a radially expand able, resilient, circumferentially extending snap ring 68. The radial depth of the groove 66 is sufficient to permit radial expansion of the snap ring 68 to permit release of the housing 32 as will be hereinafter described. The inner circumferential surface of the snap ring 68 terminates in a lip 70 which engages the groove 38 so that the groove 38 and lip 70 comprise mutually cooperating detents for preventing removal of the cartridge 14 from the base past the snap ring when the snap ring is in the retracted position as illustrated in FIG. 1. A circumferentially extending, resilient dirt seal cover 72 is secured to the retaining ring 62 and protects the snap ring 68 from environmental contaminants.

The snap ring 68 extends continuously between circumferentially spaced contiguous ends 74, 76. A camming member 78 is rotatably mounted on the base 12 between the contiguous ends 74, 76. The camming member 78 includes an eccentric lobe 80 which spreads the ends 74, 76 apart when the camming member 78 is rotated from the ring retracted position illustrated in FIG. 2 to the ring expanded position in which the eccentric lobe 80 spreads the contiguous ends 74, 76 apart. The lower end of the camming member 78 is provided with an appropriate recess 82 which is adapted to received an appropriate tool, such as a socket wrench, for rotating the camming member 78. The camming member 78 is spring loaded into the ring retracted position illustrated in the drawings.

When the filter is installed on the base 12 as illustrated in the drawings and the filter is pressurized by communicating fluid through the inlet passage 18 and through the filtering media 46, the housing 32 is pressurized, urging the latter downwardly viewing FIG. 1. Accordingly, since the lip 70 is received in the recess 38, it is then impossible to expand the retaining ring 68, since the pressure in the housing 32 prevents the latter from being forced upwardly. Accordingly, when the engine is turned on and the housing 32 is pressurized, the ring 68 cannot be expanded, which acts as a safety feature preventing removal of the filter when the engine is running. When the engine is turned off, the housing 32 may be removed by forcing the latter upwardly into the upper portion of the groove 42, thereby disengaging the lip 70 from the recess 38. Although a flat snap ring will work, the lip 70 provides this important safety feature and is preferred. The ring 68 may then be expanded by operating the camming member 78 to spread contiguous ends 74, 76 apart, thereby permitting the ring 68 to be forced radially outwardly viewing FIG. 1. Accordingly, the housing 32 may be removed from projecting portion 16, and a new filter cartridge may be installed. The ring 68 automatically, because of its resiliency, moves into the retracted position illustrated in the drawings when the camming member 78 is released. The new filter cartridge can then be installed by forcing the cartridge upwardly viewing FIG. 1, since engagement of the under side of the lip 70 with the bent over portion 36 forces the ring radially outwardly until the bent over portion 36 passes across the lip 70, whereupon the ring automatically, again because of its resiliency, moves into the retracted position illustrated in the drawings.

I claim:

1. Filter assembly comprising a base and a filter cartridge for installation on said base, said cartridge including a housing and filtering media within said housing, said housing including a circumferentially extending portion defining an opening, said base having an engaging portion sealingly engaging the opening of said housing and inlet and outlet means extending through said engaging portion communicating with the filtering media in said housing, and a radially expandable, resilient, circumferentially extending, snap ring carried by said base extending circumferentially about said hosing and cooperating with said circumferentially extending portion and the housing for releasably holding the housing on the base, said snap ring having circumferentially spaced contiguous ends and extending uninterrupted between said ends, and manually operably means between said ends for spreading said ends between retracted and expanded positions whereby said snap ring is expanded and retracted radially to permit removal and retention of said a housing respectively, said manually operable means including a camming member rotatable relative to said base and mounted between the contiguous ends of the snap ring to permit expanding and retracting of the snap ring by rotation of the caming member, said housing and said snap ring including mutually cooperating detent means for preventing removal of the housing from said base past the snap ring when the snap ring is in the retracted position.

2. Filter assembly comprising a base and a filter cartridge for installation on said base, said cartridge including a housing and filtering media within said housing, said housing including a circumferentially extending portion defining an opening, said base having an engaging portion sealingly engaging the opening of said housing and inlet and outlet means extending through said engaging portion communicating with the filtering media in said housing, and a radially expandable, resilient, circumferentially extending, snap ring carried by said base extending circumferentially about said housing and cooperating with said circumferentially extending portion and the housing for releasably holding the housing on the base, said snap ring having circumferentially spaced contiguous ends and extending uninterrupted between said ends, and manually operably means between said ends for spreading said ends between retracted and expanded positions whereby said snap ring is expanded and retracted radially to permit removal and retention of said housing respectively, said housing and said snap ring including mutually cooperating detent means for preventing removal of the housing from said base past the snap ring when the snap ring is in the retracted position, said detent means including a circumferentially extending rim on said snap ring and a circumferentially extending groove on the housing receiving said rim.

3. Filter assembly as claimed in claim 2, wherein said groove is defined by a folded-over portion of said housing at the open end of the latter.

4. Filter assembly as claimed in claim 2, wherein said base includes a cavity extending circumferentially about the circumferentially extending portion of the housing and projecting axially with respect thereto to permit axial movement of the housing with respect to the base before expansion of said snap ring to permit disengagement of the detent means.

5. Filter assembly as claimed in claim 2, wherein said base includes a circumferentially extending, radially projecting groove circumscribing the circumferentially extending portion of the housing for receiving said ring.

* * * * *